US009311508B2

United States Patent
Leslie-Hurd et al.

(10) Patent No.: US 9,311,508 B2
(45) Date of Patent: Apr. 12, 2016

(54) PROCESSORS, METHODS, SYSTEMS, AND INSTRUCTIONS TO CHANGE ADDRESSES OF PAGES OF SECURE ENCLAVES

(71) Applicant: Intel Corporation, Santa Clara, CA (US)

(72) Inventors: Rebekah M. Leslie-Hurd, Portland, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,732

(22) Filed: Dec. 27, 2013

(65) Prior Publication Data

US 2015/0186678 A1    Jul. 2, 2015

(51) Int. Cl.
*G06F 21/74* (2013.01)
*G06F 21/57* (2013.01)

(52) U.S. Cl.
CPC .............. *G06F 21/74* (2013.01); *G06F 21/572* (2013.01)

(58) Field of Classification Search
None
See application file for complete search history.

(56) References Cited

U.S. PATENT DOCUMENTS

| 4,985,825 | A  | * | 1/1991 | Webb et al. | 711/169 |
|---|---|---|---|---|---|
| 6,362,724 | B1 | * | 3/2002 | Rosenau | 340/5.2 |
| 2007/0022141 | A1 | * | 1/2007 | Singleton et al. | 707/104.1 |
| 2008/0052467 | A1 | * | 2/2008 | Thompson | 711/128 |
| 2014/0281159 | A1 | * | 9/2014 | Saito et al. | 711/103 |

* cited by examiner

*Primary Examiner* — Harunur Rashid
*Assistant Examiner* — Andrew Steinle
(74) *Attorney, Agent, or Firm* — Vecchia Patent Agent, LLC

(57) ABSTRACT

A processor of an aspect includes a decode unit to decode a user-level instruction. The user-level instruction is to indicate a page of a secure enclave and is to indicate a linear address. An execution logic is coupled with the decode unit. The execution logic is operable, in response to the user-level instruction, to change an initial linear address of the page of the secure enclave. The initial linear address is to be stored in an enclave page storage metadata unit. The initial linear address is to be changed by the execution logic to the linear address that is to be indicated by the user-level instruction. The change to the linear address is performed without contents of the page of the secure enclave being lost.

22 Claims, 13 Drawing Sheets

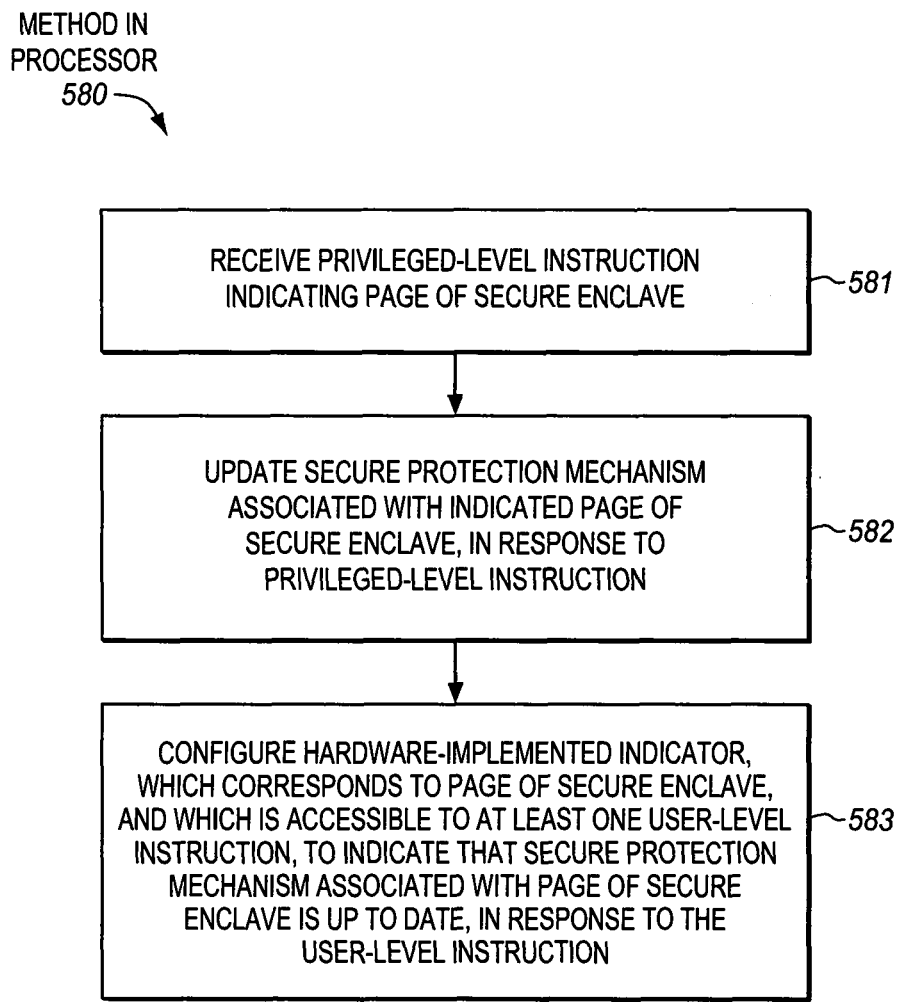

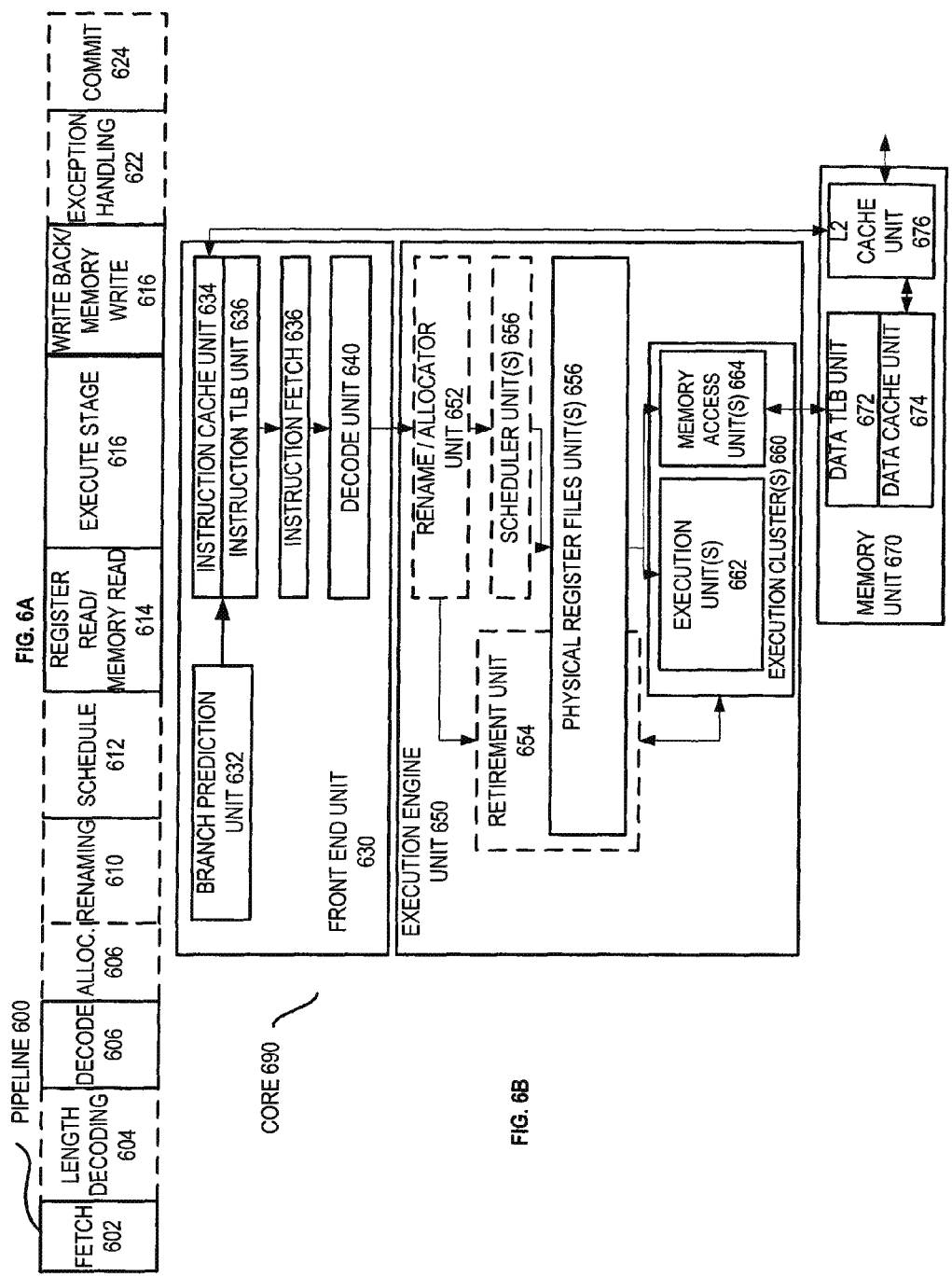

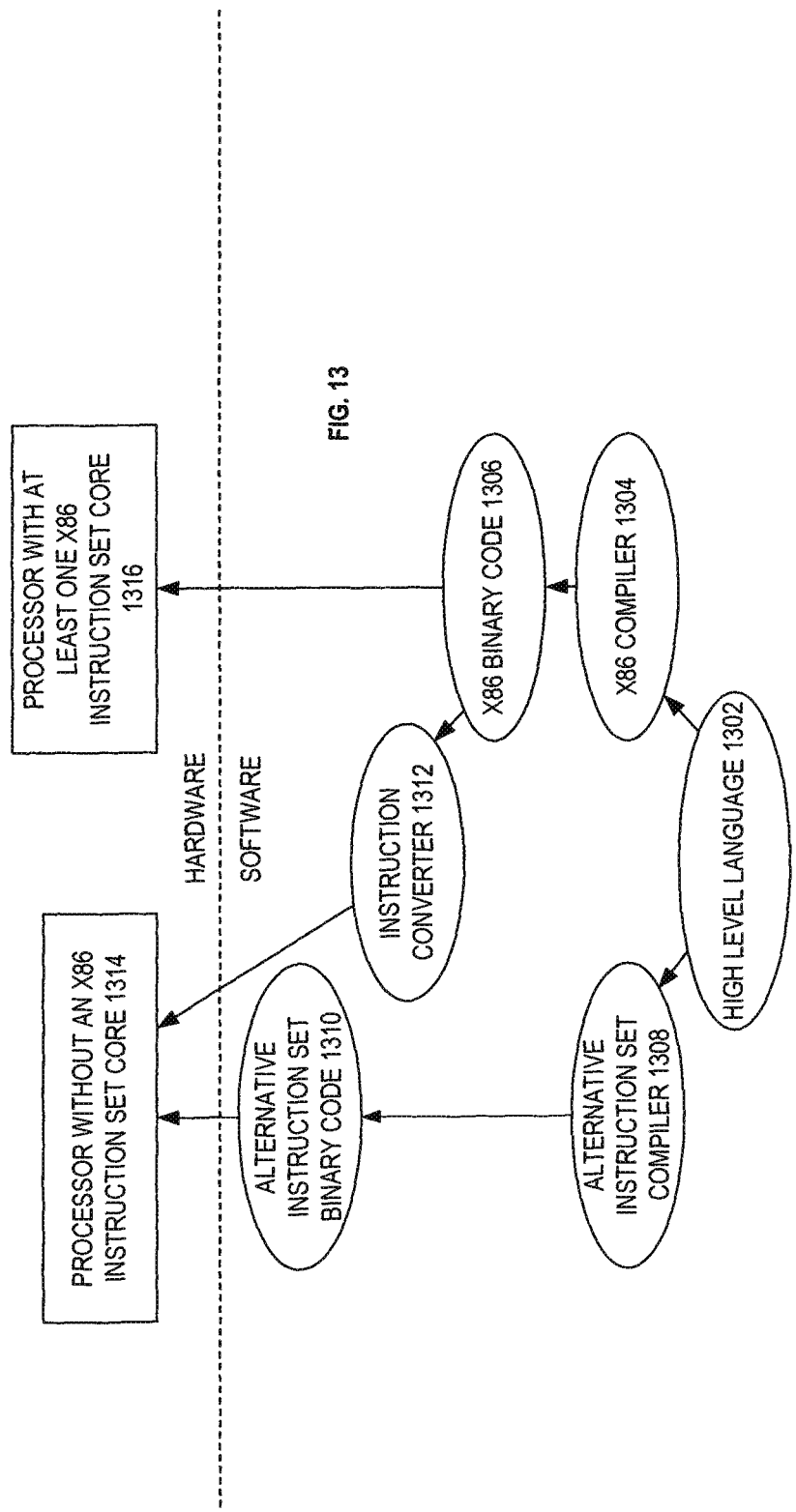

PROCESSORS, METHODS, SYSTEMS, AND INSTRUCTIONS TO CHANGE ADDRESSES OF PAGES OF SECURE ENCLAVES

BACKGROUND

1. Technical Field

Embodiments described herein generally relate to computer systems and processors. In particular, embodiments described herein generally relate to security in computer systems and processors.

2. Background Information

Securing the execution and integrity of applications and their data within a computer system is of growing importance. Techniques have been developed to provide for the secure handling and storing of confidential information. These techniques include various approaches for creating and maintaining a secured, protected, or isolated partition or environment within the computer system.

BRIEF DESCRIPTION OF THE DRAWINGS

The invention may best be understood by referring to the following description and accompanying drawings that are used to illustrate embodiments. In the drawings:

FIG. 5 is a block flow diagram of an embodiment of a method of processing an embodiment of a user-level enclave page metadata modification instruction.

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

FIG. 13 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are instructions, processors to execute the instructions, methods performed by the processors when processing or executing the instructions, and systems incorporating one or more processors to process or execute the instructions. In the following description, numerous specific details are set forth (e.g., specific instruction operations, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
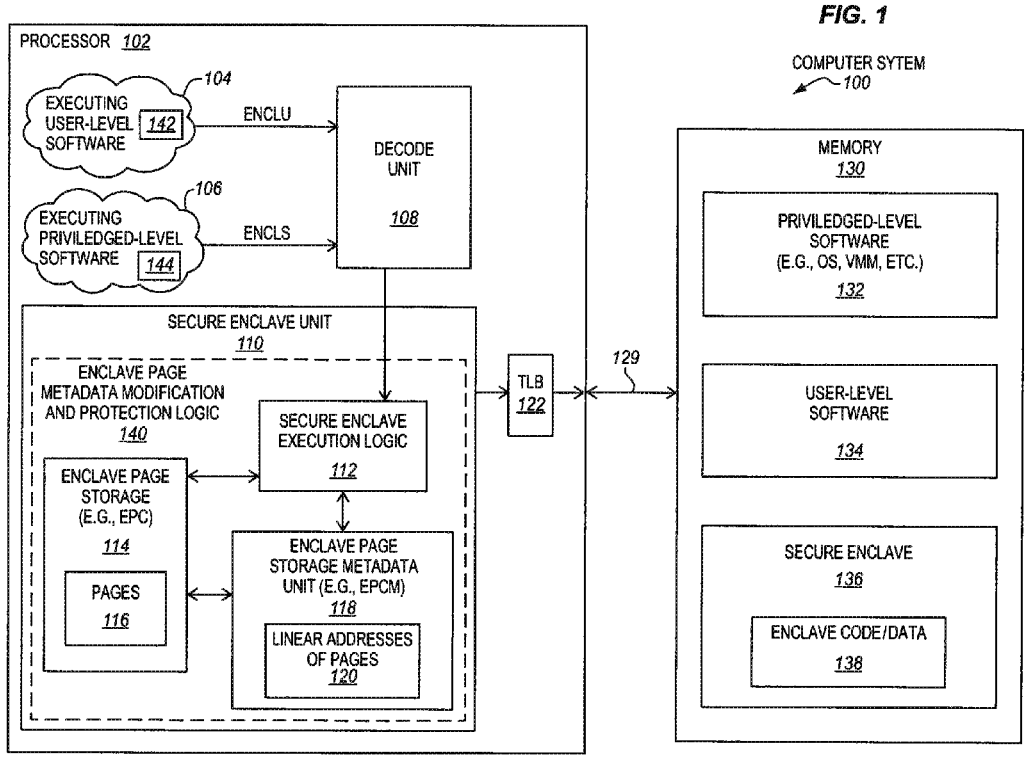
FIG. 1 is a block diagram of an embodiment of a computer system that is operable to provide a secure enclave, and in which embodiments of the invention may be implemented.

FIG. 1 is a block diagram of an embodiment of a computer system 100 that is operable to provide a secure enclave 136, and in which embodiments of the invention may be implemented. The computer system includes a processor 102. In some embodiments, the processor may be a general-purpose processor (e.g., a general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors.

The computer system also includes a memory 130. The processor and the memory are coupled, or otherwise in communication with one another, by a conventional coupling mechanism 129 (e.g., through one or more buses, hubs, memory controllers, chipset components, or the like). The memory may include one or more different memory devices and/or one or more different types of memory.

The memory has stored therein privileged-level or supervisory-level software 132, such as, for example, one or more operating systems (OS), virtual machine monitors (VMMs), software to operate at ring 0, or the like. The memory also has stored therein user-level software 134, such as, for example, one or more user-level applications (e.g., graphics applications, word processing applications, financial applications, etc.). During operation, a portion of the user-level software 134 may be executed or performed by the processor as executing user-level software 104. Similarly, a portion of the privileged-level software 132 may be executed or performed by the processor as executing privileged-level software 106. The executing software may include macroinstructions or instruction set architecture (ISA) instructions that are fetched, decoded, and executed by the processor. This executing software may be provided to a decode unit 108 (as well as other components in the processor pipeline (e.g., fetch unit, instruction queues, execution units, etc.).

In some embodiments, the computer system 100 may also be operable to provide the secure enclave 136. In the illustration only a single secure enclave is shown, although it is to be appreciated that there may optionally be multiple secure enclaves. As used herein, the term "secure enclave" is used broadly to refer to a secured, protected, or isolated environment or container in which an application or other software may run, execute, be loaded, or otherwise be present. Examples of secure enclaves include, but are not limited to, secure containers, secure execution environments, isolated execution environments, and the like. By way of example, code and/or data 138 (e.g., associated with the user-level software 134), may be put in and executed from the secure enclave. In some embodiments, the secure enclave may provide a protected area in the application's address space (e.g., a contiguous range in a linear address space), which may provide confidentiality and integrity against software and hardware attacks, generally even in the presence of privileged malware. The secure enclave may provide a safe place for software (e.g., the user-level software 134) to place and execute code and store data in the context of a privileged-level software process.

In embodiments, the processor 102 may include processor extensions to instantiate, manage, and otherwise support the secure enclave 138. In some embodiments, the extensions may be operable to prevent accesses to the secure enclave memory area from any software not resident in the secure enclave including privileged malware. In some embodiments, the processor extensions may include instructions of an instruction set of the processor as well as hardware and/or other on-die logic to support the secure enclave. As shown, the processor may have a secure enclave unit 110. The secure enclave unit may be operable to assist with various operations related to creating and maintaining the secure enclave. The secure enclave unit may be implemented in hardware (e.g., circuitry), firmware (e.g., control signals stored on non-volatile memory), software, or some combination thereof (e.g., hardware potentially combined with some firmware and/or some software). One suitable example of the processor extensions includes the Intel® Software Guard Extensions (Intel® SGX), which may be added to future Intel® Architecture processors, although the scope of the invention is not so limited. Intel® SGX may also be referred to herein simply as SGX. Further details of SGX, if desired, are available in Software Guard Extensions Programming Reference, Document Number 329298-001US, published September 2013, available from Intel Corporation. Further details of examples of SGX, as well as other suitable extensions, are also described in U.S. patent application Ser. No. 13/527,547, entitled "Method and Apparatus to Provide Secure Application Execution," filed Jun. 19, 2012.

As shown, in some embodiments, the secure enclave unit 110 may include a secure enclave page storage 116, which may be used by the processor to store pages 116 having enclave code and/or enclave data for one or more executing enclaves. By way of example, one suitable embodiment of the secure enclave page storage as used in SGX implementations is an Enclave Page Cache (EPC). The secure enclave may run or be executed from the secure enclave page storage. The secure enclave page storage may represent an area of physical memory. In one aspect, the pages 116 may be loaded into the enclave page storage by the privileged-level software. While inside the enclave page storage, the pages may be protected from non-enclave memory accesses using access control mechanisms provided by the processor. For example, the secure enclave unit may have an access control mechanism (e.g., access control logic, range registers, etc.) to prevent access to the pages within the enclave page storage except by an application running on processor within the secure enclave to which the page is allocated). In some embodiments, whenever a page of a secure enclave is removed from the enclave page storage, cryptographic protections may be used to protect the confidentiality of the secure enclave and to detect tampering when the page is loaded back into the enclave page storage. The secure enclave may abide by segmentation and paging policies imposed by the privileged-level software. For example, OS and/or VMM-managed page tables and extended page tables may provide address translation for the pages of the secure enclave. The processor may have hardware or logic to guarantee that the pages will be mapped to the enclave page storage. Failures may potentially generate exceptions.

Referring again to FIG. 1, in some embodiments, the secure enclave unit 110 may also include a secure enclave page storage metadata unit 118, which may store metadata for the pages 116 of the enclave page storage 114. By way of example, one suitable embodiment of the secure enclave page storage metadata unit as used in SGX implementations is an Enclave Page Cache Map (EPCM). The secure enclave page storage metadata unit may represent an internal micro-architectural data structure (e.g., hardware implemented data structure) of the processor. In the illustrated embodiment, the secure enclave page storage metadata unit is shown as a separate structure from the secure enclave page storage 114, although in other embodiments they may instead be integrated as a single component. In one aspect, the secure enclave page storage metadata unit may store an entry or other set of metadata for each page in the enclave page storage. As shown, in some embodiments, the entries or sets of metadata may include linear addresses 120 through which the secure enclave(s) are allowed to access the pages 116. The processor may have a translation lookaside buffer (TLB) 122, which may cache translations of the linear pages that may be used to access the memory. In some embodiments, the metadata may also optionally include a blocked bit or status to indicate whether the page is or is not in a blocked state. Other examples of suitable types of metadata include, but is not limited to, the status of secure enclave pages with respect to validity and accessibility, an identification of the secure enclave instance corresponding to the pages, read and/or write and/or execute permissions of the pages, the types of pages, and combinations thereof. The processor and/or the secure enclave unit may be operable to use the enclave page storage metadata unit to enforce access-controls on the pages in the secure enclave page storage. In some embodiments, the enclave page storage metadata unit may not be accessible by software.

The processor extensions may also include instructions to instantiate, manage, or otherwise support the secure enclave. In some embodiments, the instructions may include two different types of instructions. In particular, a first type of instruction may be executed or performed only by the executing user-level software 104 and/or at an unprivileged status (e.g., at ring 3). A second type of instruction may be executed or performed only by the executing privileged-level or supervisory-level software 106 and/or at a privileged status (e.g., at ring 0). By way of example, in SGX implementations, the instructions may be organized as so-called "leaf functions" under two instruction mnemonics, namely ENCLSx for the privileged-level type instructions and ENCLUx for the unprivileged or user-level type instructions. However, as previously mentioned, embodiments are not limited to SGX, but may be used in other implementations of secure enclaves.

In SGX implementations, the ENCLSx mnemonic is for executing an enclave system function of a specified leaf number. The ENCLSx instructions may be executed only by privileged-level software (e.g., at ring 0). Such instructions are used to execute privileged SGX leaf functions that are used for managing enclaves, debugging enclaves, and the like. The ENCLSx instructions may invoke the specified privileged SGX leaf functions. In the case of SGX, software may specify the leaf function by setting the appropriate value (e.g., a leaf function index) in the implicit general-purpose x86 register EAX as input. In the case of SGX, the general-purpose registers RBX, RCX, and RDX may have leaf-specific purposes, for example, to provide an input, to provide an output, or may be unused. The use or lack of use of these additional registers may be implied by or implicit for the respective leaf function index.

The ENCLUx mnemonic is for executing an enclave user function of a specified leaf number. The ENCLUx instructions may be executed by user-level or unprivileged software (e.g., at ring 3). Such instructions may be used to execute non-privileged SGX leaf functions that are used for operating the enclaves. The ENCLUx instructions may invoke the specified non-privileged SGX leaf functions. In the case of SGX, software may specify the leaf function by setting the appropriate value in the implicit general-purpose x86 register EAX as input. In the case of SGX, the general-purpose registers RBX, RCX, and RDX may have leaf-specific purposes, for example, to provide an input, to provide an output, or may be unused. The use or lack of use of these additional registers may be implied by or implicit for the respective leaf function index.

For the ENCLSx and ENCLUx mnemonics, each leaf function index may also be associated with a unique leaf-specific mnemonic. A long-form expression of an SGX instruction may have the form ENCLx[LEAF_MNEMONIC], where 'x' may be either 'S' to designate a privileged-level software executable instruction, or 'U' to designate a user-level software executable instruction. For simplicity, the long-form instructions are also referred to herein simply by their "leaf_mnemonic" alone. Various different instructions are provided to instantiate, manage, debug, or otherwise support secure enclaves. For example, SGX includes supervisor instructions to create a secure enclave, initialize a secure enclave, add a page, remove a page from EPC, extend an EPC page measurement, etc. As an example, an EADD instruction may be used to add a page. Performing the EADD instruction may cause the processor to initialize an EPCM entry and add to the entry, among other metadata, the linear address that is to be used by the secure enclave to access the newly added page. SGX also includes user-level instructions to enter an enclave, exit an enclave, re-enter an enclave, etc. The secure enclave unit 110 may include secure enclave execution logic 112 to perform the various operations or functionalities of these instructions. It is to be appreciated that some of the execution logic may be either inside or outside of the secure enclave unit (e.g., may potentially use some logic not limited to the secure enclave unit). Further details of these various instructions are found in the Software Guard Extensions Programming Reference.

Conventionally, implementations of secure enclaves, for example SGX implementations of secure enclaves, generally do not allow for dynamic page relocation. For example, SGX implementations provide certain ways in which privileged-level software can dynamically manage the memory that belongs to a protected execution area. As previously described, there are instructions (e.g., instruction leafs) in SGX to add a page, remove a page, block an EPC page, extend an EPC page measurement, etc. However, the memory management options available in SGX currently are limited in that memory pages are allocated at a fixed linear address. The linear address of the memory page generally cannot be changed during the life of the data (i.e., without destroying the data). Consequently, in current implementations of SGX, to relocate a protected memory page from one linear address to another generally involves first freeing the protected memory page, and then reallocating it at the new linear address, however this zeroes or destroys the contents of the protected memory page. Consequently, current SGX implementations do not allow for real dynamic page relocation in which the linear address of the page is changed during the life of the page without zeroing, erasing, writing over, or otherwise losing all of the contents of the page. As a result, SGX implementations of secure enclaves generally do not allow dynamic library loaders to run within the secure enclaves. Dynamic library loaders generally allocate memory pages at a private linear address during the loading process, and then dynamically relocate the memory page to the target linear address. This approach is used to satisfy their security objectives. When performing such dynamic page relocation for dynamic library loaders, the content of the pages typically should not be zeroed or otherwise destroyed when the pages are dynamically relocated.

Referring again to FIG. 1, in some embodiments, the instruction set of the processor may include an embodiment of a user-level enclave page metadata modification instruction 142 that may be performed by user-level software (e.g., software 134). In some embodiments, the instruction set of the processor may also optionally include an embodiment of a privileged-level secure protection mechanism update instruction 144 that may be performed by privileged-level software (e.g., 132). In some embodiments, the processor and/or the secure enclave unit 110 may include enclave page metadata modification and secure protection logic 140 that may be responsive to the user-level enclave page metadata modification instruction 142 and/or the privileged-level secure protection mechanism update instruction 144. In some embodiments, the logic 140 may be distributed amongst different components of the secure enclave unit, such as, for example, the secure enclave execution logic, the enclave page storage metadata unit, and the like. In some embodiments, the logic 140 may include any of the logic shown and described elsewhere herein (e.g., in conjunction with FIGS. 2-3).

In some embodiments, the user-level enclave page metadata modification instruction 142 may be operable to cause the processor and/or the enclave page metadata modification and secure protection logic 140 to change or modify metadata of an enclave page (e.g., one of the pages 116). In some embodiments, the instruction may be operable to cause the processor and/or the logic 140 to change or modify a linear address of the enclave page during its lifetime and/or without zeroing or destroying the contents of the enclave page. In some embodiments, this may be used to perform dynamic page relocation within a secure enclave, such as, for example, the type of dynamic page relocation commonly used by dynamic library loaders. In some embodiments, the user-level enclave page metadata modification instruction 142 may also optionally be operable to cause the processor and/or the logic 140 to configure an indication that the attributes or metadata of the page have been modified and that a secure protection mechanism (e.g., a tracking or blocking mechanism) for the page is stale or outdated. In some embodiments, the user-level enclave page metadata modification instruction 142 may include any of the characteristics or attributes of the instructions shown and described in conjunction with FIG. 2.

In some embodiments, the privileged-level secure protection mechanism update instruction 144 may be operable to cause the processor and/or the enclave page metadata modification and secure protection logic 140 to update a secure protection mechanism (e.g., a blocking mechanism or tracking mechanism) associated with the page for which the metadata was modified. Advantageously, updating the secure protection mechanism may help to prevent access to the page for which the metadata (e.g., the linear address) has been modified until safe to do so. The secure protection mechanism may help to avoid the possibility of threads or other entities observing or accessing different views of enclave pages (e.g., before and after the modification) as a result of translation lookaside buffers (TLBs) and/or other caching or buffering structures of the processor. For example, the secure protection mechanism may help to restrict access to an enclave page until all related page translations have been cleared from TLBs and/or other translation-related caching or buffering structures of the processor. In some embodiments, the privileged-level secure protection mechanism update instruction 144 may also be operable to cause the processor and/or the enclave page metadata modification and secure protection logic 140 to configure the indication, which was previously configured as a result of the instruction 142, to indicate that the secure protection mechanism has been updated or is no longer outdated. In some embodiments, the privileged-level secure protection mechanism update instruction 144 may include any of the characteristics or attributes of the instructions shown and described in conjunction with FIG. 4.

Advantageously, the instruction 142 and the logic 140 may be used to allow linear addresses of enclave pages to be modified without zeroing or destroying the contents of the enclave pages (e.g., during the ongoing lifetime of the enclave pages). In some embodiments, this may be used to perform dynamic page relocation within a secure enclave, such as, for example, the type of dynamic page relocation commonly used by dynamic library loaders. This may allow dynamic library loaders to run within a secure enclave. This in turn may allow a broader class of software to run within the secure enclaves. This may also help to significantly improve the performance of applications running within the secure enclaves. The instruction 144 and the logic 140 may allow the secure protection mechanism to be updated, which in the case of linear address changes may help to prevent access to the enclave pages until safe to do so (e.g., until all relevant page translations have been cleared from translation lookaside buffers and/or other translation-related structures of the processor).

Figure 2:
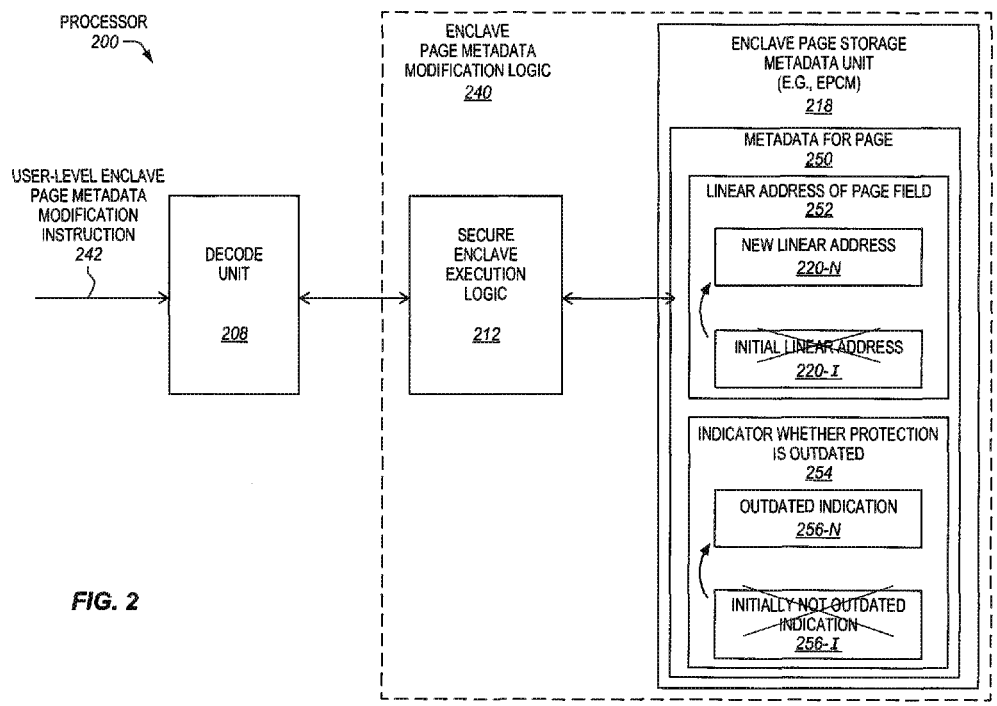
FIG. 2 is a block diagram of an embodiment of processor that is operable to perform an embodiment of a user-level enclave page metadata modification instruction.

FIG. 2 is a block diagram of an embodiment of processor 200 that is operable to perform an embodiment of a user-level enclave page metadata modification instruction 242. In embodiments, the processor 200 may have any of the components, features, and/or specific optional details described previously for the processor 100 of FIG. 1. Alternatively, the processor 200 may have similar or different components, features, and/or details.

The illustrated processor includes a decode unit or decoder 208. The decode unit may receive and decode the user-level enclave page metadata modification instruction 242. The instruction 242 is a user-level instruction. For example, in an embodiment of an SGX implementation, the instruction may be a leaf of the ENCLU instruction (e.g., ENCLU[EMODPLA]). In such an SGX implementation, the instruction 242 may be recognized in part by a value in a general-purpose register EAX, although the scope of the invention is not so limited. In some embodiments, the instruction 242 may be executable only in the relevant secure enclave. The instruction 242 may represent a relatively higher-level macroinstruction, machine code instruction, or assembly language instruction. The decoder may decode the instruction and output one or more relatively lower-level microinstructions, micro-operations, micro-code entry points, or other relatively lower-level instructions or control signals that reflect, represent, and/or are derived from the instruction 242. The one or more lower-level instructions or control signals may implement the instruction 242 through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art.

Referring again to FIG. 2, enclave page metadata modification logic 240 is coupled with the output of the decode unit 208. The enclave page metadata modification logic 240 includes enclave page storage metadata unit 218. In some embodiments, the enclave page storage metadata unit may include an enclave page cache map (EPCM), and may have any characteristics of an EPCM known in the arts, although the scope of the invention is not so limited. The enclave page storage metadata unit may include metadata for enclave pages, including metadata 250 for a given enclave page. As shown, in some embodiments, the metadata 250 may include a linear address field 252 for the given enclave page. Initially, the linear address field may store an initial linear address 220-I used to access the given enclave page. As shown, in some embodiments, the metadata 250 may also include an indicator 254 of whether or not a secure protection mechanism associated with the corresponding enclave page is outdated or stale. Initially, the indicator 254 may store an indication 256-I that the secure protection mechanism is not outdated or stale. The metadata 250 may also include various other types of metadata (not shown), such as, for example, in some embodiments, read and/or write and/or execute permissions, other types of metadata in an EPCM, or the like. The scope of the invention is not limited to such other types of metadata which may or may not be included in the particular implementation.

The enclave page metadata modification logic 240 also includes secure enclave execution logic 212 coupled with the output of the decode unit. The execution logic 212 may receive the one or more decoded or otherwise converted instructions or control signals that represent and/or are derived from the instruction 242. The execution logic may be operable in response to and/or as a result of the user-level enclave page metadata modification instruction 242 (e.g., in response to one or more instructions or control signals decoded from the instruction 242) to change or modify the metadata 250. For example, as shown, in some embodiments the execution logic may change or modify the initial linear address 220-I in the linear address field 252 to a new linear address 220-N. In some embodiments, the instruction 242 may provide the old linear address and the new linear address in two implicitly indicted registers. In other embodiments, the instruction 242 may explicitly specify two registers having the old and new linear addresses. In some embodiments, this change or modification of the linear address may be achieved without zeroing or destroying the contents of the corresponding enclave page. In some embodiments, this may be done in conjunction with dynamic page relocation. In some embodiments, this may be done by a dynamic library loader, which in some embodiments may run within the corresponding secure enclave (e.g., the enclave mapped to the enclave page by other metadata). Alternatively, in other embodiments, the instruction may be used to modify other types of metadata (e.g., read/write/execute permissions for an enclave page, perform other legal access rights modifications, etc.).

In some embodiments, the execution logic may also optionally be operable in response to and/or as a result of the user-level enclave page metadata modification instruction 242 (e.g., in response to one or more instructions or control signals decoded from the instruction 242) to configure the indicator 254 that the secure protection mechanism is (or at least is believed to be potentially) outdated or stale. For example, as shown, in some embodiments the execution logic may change the initial indication 256-I that the secure protection mechanism is not outdated or stale, to a new or updated indication 256-N that the secure protection mechanism is (or at least is believed to be potentially) outdated or stale. In some embodiments, user-level software, through the user-level instruction 242, may modify or configure the indicator 254 to indicate that the metadata for a page has been modified, for example a linear address of the page has been modified, and that the corresponding secure protection mechanism for the enclave page (e.g., a blocked epoch) may be stale or outdated. For example, the outdated indication may be interpreted as an indication that the modified page is not tracked and/or that the modified pages blocked epoch is stale. In some embodiments, the user-level software may not be able to update the secure protection mechanism (e.g., may not be able to generate a new blocked epoch to replace the stale or outdated blocked epoch), since updating the secure protection mechanism may be reserved for privileged-level software (e.g., the user-level software may not have sufficient access to the hardware secure protection mechanism of the secure enclave). For example, this may be the case in order to help to avoid problematic concurrent interactions or conflicts with ENCLS leaves. Instead, the user-level software, through the user-level instruction 242, may modify or configure the indicator 254 to indicate that the secure protection mechanism is stale or outdated. The privileged-level software (e.g., an OS, VMM, etc.) may be able to read or observe the indicator 254. Thus, in some embodiments, the indicator 254 may be used as a hint or trigger to communicate a need to update the secure protection mechanism (e.g., a need for a new blocked epoch) from the user-level software, to the privileged-level software.

Different types of indicators 254 are suitable for different embodiments. In some embodiments, the indicator 254 may be a hardware-implemented indicator of the processor. In some embodiments, there may be one such indicator per enclave page. The use of such a hardware-implemented indicator may help to provide improved security over a software-implemented indicator. Examples of suitable indicators include, but are not limited to, bits, flags, fields or values in registers, fields or values in hardware-implemented data structures, and the like. In some embodiments, the indicator may be architecturally-visible. In some embodiments, the indicator may include one or more bits, fields, portions of an entry, or other portions of an EPCM, although the scope of the invention is not so limited. For example, in one example embodiment, the indicator may be a new bit, referred to herein as a U-bit, which may be added to an EPCM (e.g., one U-bit per entry and/or per enclave page). According to one possible convention, the U-bit may be set to a logical value of one by user-level software to indicate that the secure protection mechanism is outdated (e.g., a blocked epoch is stale), and may be cleared to a logical value of zero by privileged-level software to indicate that the secure protection mechanism is up-to-date or current (e.g., a new blocked epoch has been generated). The opposite convention is also possible in an alternate embodiment. It is to be appreciated that this is just one example, and that instead another form of indicator may optionally be used instead.

The execution logic and/or the processor may include specific or particular logic (e.g., transistors, integrated circuitry, or other hardware potentially combined with firmware (e.g., instructions stored in non-volatile memory) and/or software) that is operable to perform the instruction 242 and/or modify the metadata of the enclave page in response to the instruction 242 (e.g., in response to one or more instructions or control signals decoded or otherwise derived from the instruction 242).

Figure 3:
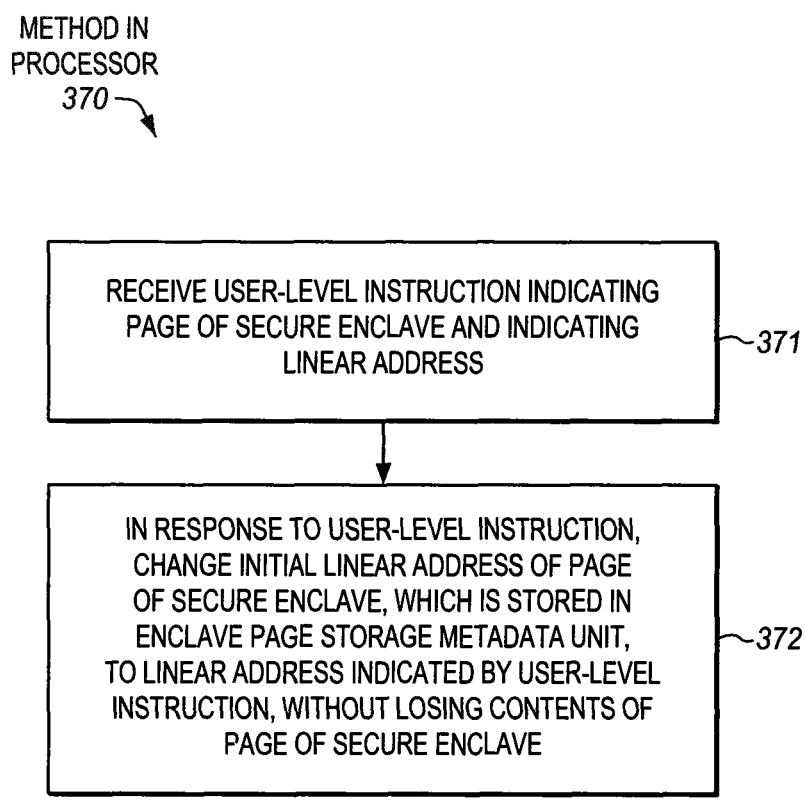
FIG. 3 is a block flow diagram of an embodiment of a method of processing an embodiment of a user-level enclave page metadata modification instruction.

FIG. 3 is a block flow diagram of an embodiment of a method 370 of processing an embodiment of a user-level enclave page metadata modification instruction. In various embodiments, the method may be performed by a processor, instruction processing apparatus, or other digital logic device. In some embodiments, the operations and/or method of FIG. 3 may be performed by and/or within the processor of FIG. 1 and/or FIG. 2. The components, features, and specific optional details described herein for the processor and/or apparatus of FIG. 1 and/or FIG. 2 also optionally apply to the operations and/or method of FIG. 3. Alternatively, the operations and/or method of FIG. 3 may be performed by and/or within a similar or different processor or apparatus. Moreover, the processor of FIG. 1 and/or FIG. 2 may perform operations and/or methods the same as, similar to, or different than those of FIG. 3.

The method includes receiving a user-level instruction, at block 371. In some embodiments, the user-level instruction may indicate a page of a secure enclave and may indicate a linear address. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The method includes, in response to the user-level instruction, changing an initial linear address of the page of the secure enclave, which is stored in an enclave page storage metadata unit, to the linear address indicated by the user-level instruction, at block 372. In some embodiments, this may be done without zeroing, erasing, or otherwise losing the contents of the page of the secure enclave. In some embodiments, the instruction may optionally indicate two registers, one having the initial linear address to be changed, and another having the new linear address. In some embodiments, the method may also optionally include configuring a hardware-implemented indicator to indicate that a secure protection mechanism associated with the page is stale or outdated.

Figure 4:
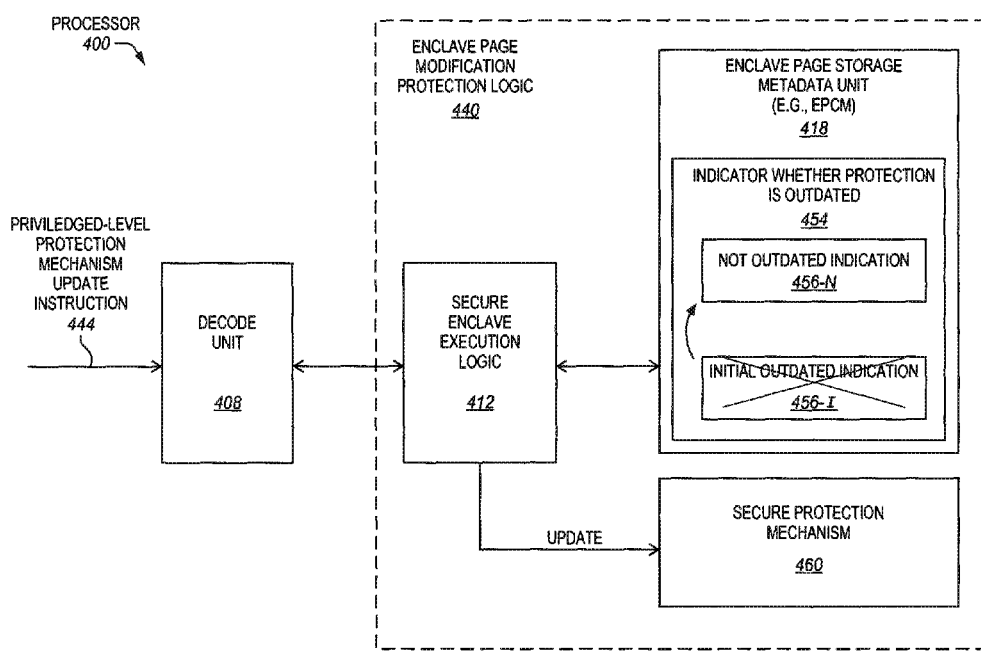
FIG. 4 is a block diagram of an embodiment of processor that is operable to perform an embodiment of a privileged-level secure protection mechanism update instruction.

FIG. 4 is a block diagram of an embodiment of processor 400 that is operable to perform an embodiment of a privileged-level secure protection mechanism update instruction 444. In embodiments, the processor 400 may have any of the components, features, and/or specific optional details described previously for the processor 100 of FIG. 1. Alternatively, the processor 400 may have similar or different components, features, and/or details.

The illustrated processor includes a decode unit or decoder 408. The decode unit may receive and decode the privileged-level secure protection mechanism update instruction 444. The instruction 444 is a privileged-level instruction. For example, in an embodiment of an SGX implementation, the instruction may be a leaf of the ENCLS instruction (e.g., ENCLS[ETRACKPG]). In such an SGX implementation, the instruction 444 may be recognized in part by a value in a general-purpose register EAX, although the scope of the invention is not so limited. In some embodiments, the instruction 444 may be executable only by privileged or supervisory-level software. In some embodiments, the instruction may indicate an address of the target enclave page (e.g., implicitly indicate a general-purpose register having the address of the target enclave page). The instruction 444 may represent a relatively higher-level macroinstruction, machine code instruction, or assembly language instruction. The decoder may decode the instruction and output one or more relatively lower-level microinstructions, micro-operations, micro-code entry points, or other relatively lower-level instructions or control signals that reflect, represent, and/or are derived from the instruction 444. The one or more lower-level instructions or control signals may implement the instruction 444 through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art.

Referring again to FIG. 4, enclave page modification secure protection logic 440 is coupled with the output of the decode unit 408. The enclave page modification secure protection logic 440 includes enclave page storage metadata unit 418. The enclave page storage metadata unit 418 may be similar to or the same as those described elsewhere herein (e.g., unit 118, 218, etc.). In some embodiments, the enclave page storage metadata unit may include an enclave page cache map (EPCM), and may have any characteristics of an EPCM known in the arts, although the scope of the invention is not so limited.

The enclave page metadata modification logic 440 also includes secure enclave execution logic 412 coupled with the output of the decode unit. The execution logic 412 may receive the one or more decoded or otherwise converted instructions or control signals that represent and/or are derived from the instruction 444. The execution logic may be operable in response to and/or as a result of the privileged-level secure protection mechanism update instruction 444 (e.g., in response to one or more instructions or control signals decoded from the instruction 444) to update a secure protection mechanism 460 associated with the an enclave page corresponding to an indicator 454 that indicates that its associated secure protection mechanism is outdated or stale. The secure protection mechanism may help to avoid threads or other entities in the system accessing or viewing different versions of enclave pages (e.g., before and after the modification) in the presence of TLBs and other translation-related caching or buffering structures of the processor. By way of example, in some embodiments, updating the secure protection mechanism may include generating or setting a new blocked epoch associated with the enclave page corresponding to the indicator 454 that indicates that its associated secure protection mechanism is outdated or stale (e.g., stamping the page with the blocked epoch). The epoch may be operable to prevent access to the modified enclave page until all relevant translation mappings have been cleared from the TLB and/or other relevant structures of the processor. By way of example, the blocked epoch may cause a modified bit for the enclave page to remain set until all threads with smaller epochs than the updated blocked epoch have left the secure enclave, although the scope of the invention is not so limited. Alternatively, other secure protection mechanisms may be used instead. For example, the TLBs may be flushed. As another example, specific linear addresses may be flushed from the TLBs. Other forms of secure protection mechanisms will be apparent to those skilled in the art and having the benefit of the present disclosure.

In some embodiments, the execution logic 412 may also optionally be operable in response to and/or as a result of the privileged-level secure protection mechanism update instruction 444 (e.g., in response to one or more instructions or control signals decoded from the instruction 444) to modify or configure the indicator 454 that the secure protection mechanism is not outdated or is current. Any of the previously mentioned indicators are suitable (e.g., the U-bit in the EPCS and/or any of the others discussed in conjunction with FIG. 2). As shown, in some embodiments the execution logic may change the initial indication 456-I that the secure protection mechanism is outdated or stale, to a new or updated indication 456-N that the secure protection mechanism is not outdated or is current. In some embodiments, privileged-level software may perform the privileged-level instruction 444 after reading the initial outdated indication 456-I or otherwise learning of the outdated indication. That is, the privileged-level software may regard the initial outdated indication 456-I as a hint or trigger that the secure protection mechanism 460 needs to be updated, and may responsively perform the privileged-level instruction 444 to update the secure protection mechanism.

The execution logic and/or the processor may include specific or particular logic (e.g., transistors, integrated circuitry, or other hardware potentially combined with firmware (e.g., instructions stored in non-volatile memory) and/or software) that is operable to perform the instruction 444 and/or modify the metadata of the enclave page in response to the instruction 444 (e.g., in response to one or more instructions or control signals decoded or otherwise derived from the instruction 444).

FIG. 5 is a block flow diagram of an embodiment of a method 580 of processing an embodiment of a privileged-level protection mechanism update instruction. In various embodiments, the method may be performed by a processor, instruction processing apparatus, or other digital logic device. In some embodiments, the operations and/or method of FIG. 5 may be performed by and/or within the processor of FIG. 1 and/or FIG. 4. The components, features, and specific optional details described herein for the processor and/or apparatus of FIG. 1 and/or FIG. 4 also optionally apply to the operations and/or method of FIG. 5. Alternatively, the operations and/or method of FIG. 5 may be performed by and/or within a similar or different processor or apparatus. Moreover, the processor of FIG. 1 and/or FIG. 4 may perform operations and/or methods the same as, similar to, or different than those of FIG. 5.

The method includes receiving a privileged-level instruction indicating a page of a secure enclave, at block 581. In some embodiments, the instruction may indicate an address of the target enclave page (e.g., implicitly indicate a general-purpose register having the address of the target enclave page). In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The method includes updating a secure protection mechanism associated with the indicated page of the secure enclave, in response to the privileged-level instruction, at block 582. In various embodiments, this may be done in any of the various ways described elsewhere herein. The method includes configuring a hardware-implemented indicator, which corresponds to the page of the secure enclave, and which is accessible to at least one user-level instruction, to indicate that the secure protection mechanism associated with the page of the secure enclave is up to date, in response to the user-level instruction, at block 583.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-order and out-of-order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 7B:
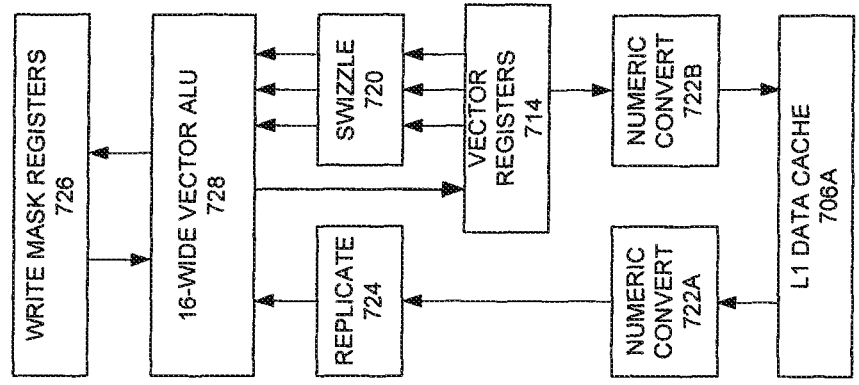
FIG. 7B is an expanded view of part of the processor core in FIG. 7A according to embodiments of the invention.
Figure 7A:
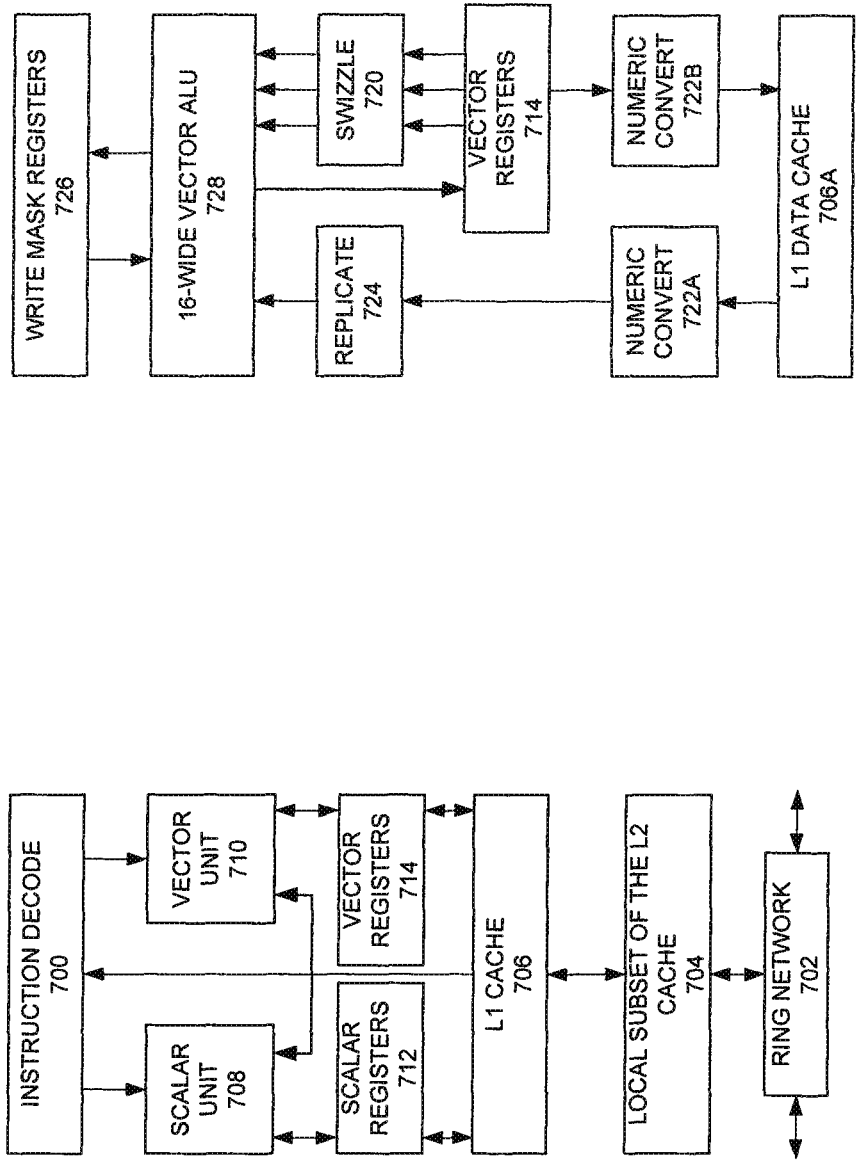
FIG. 7A is a block diagram of a single processor core, along with its connection to the on-die interconnect network and with its local subset of the Level 2 (L2) cache, according to embodiments of the invention.

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Processor with Integrated Memory Controller and Graphics

Figure 8:
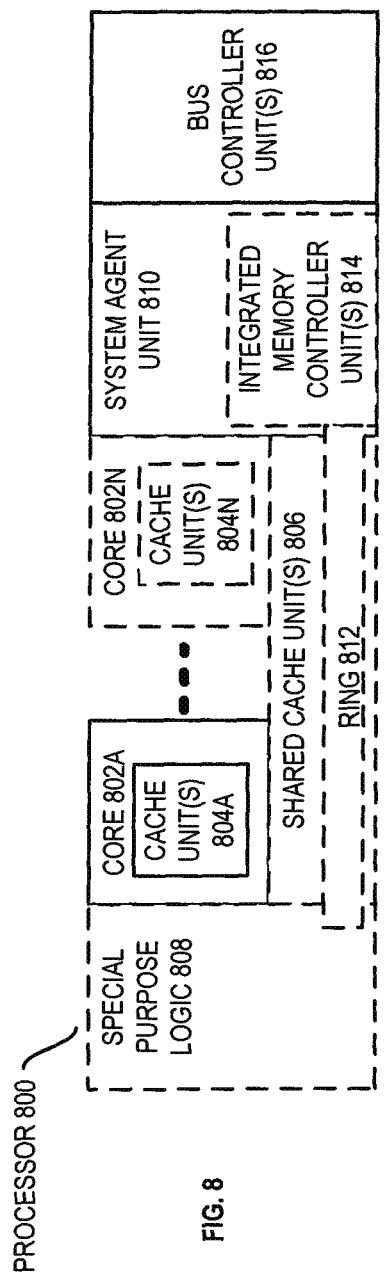
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
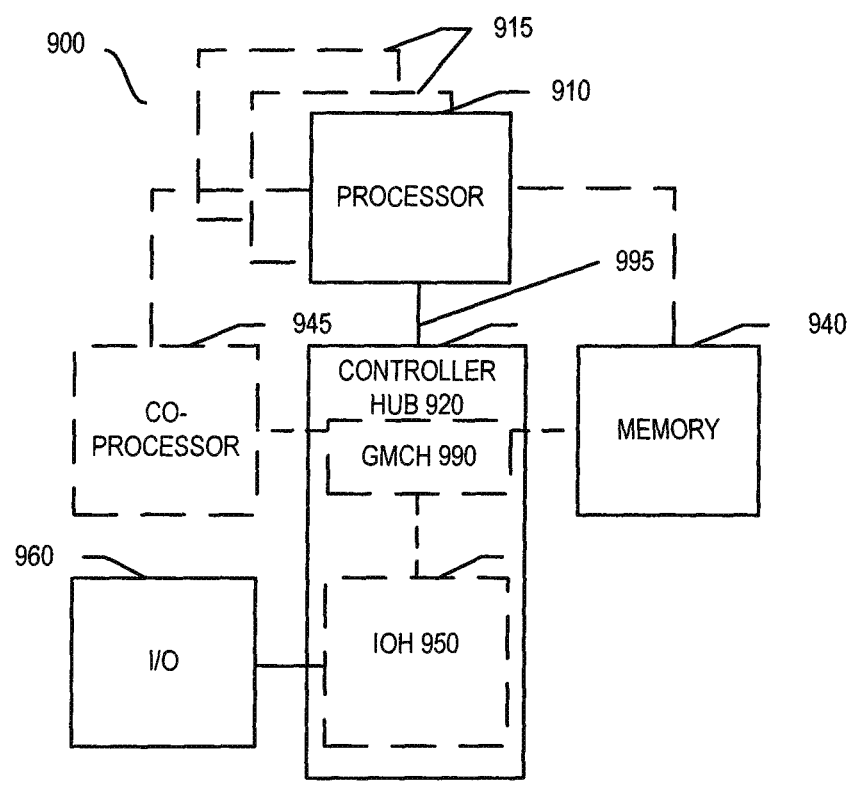
FIG. 9 shown is a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
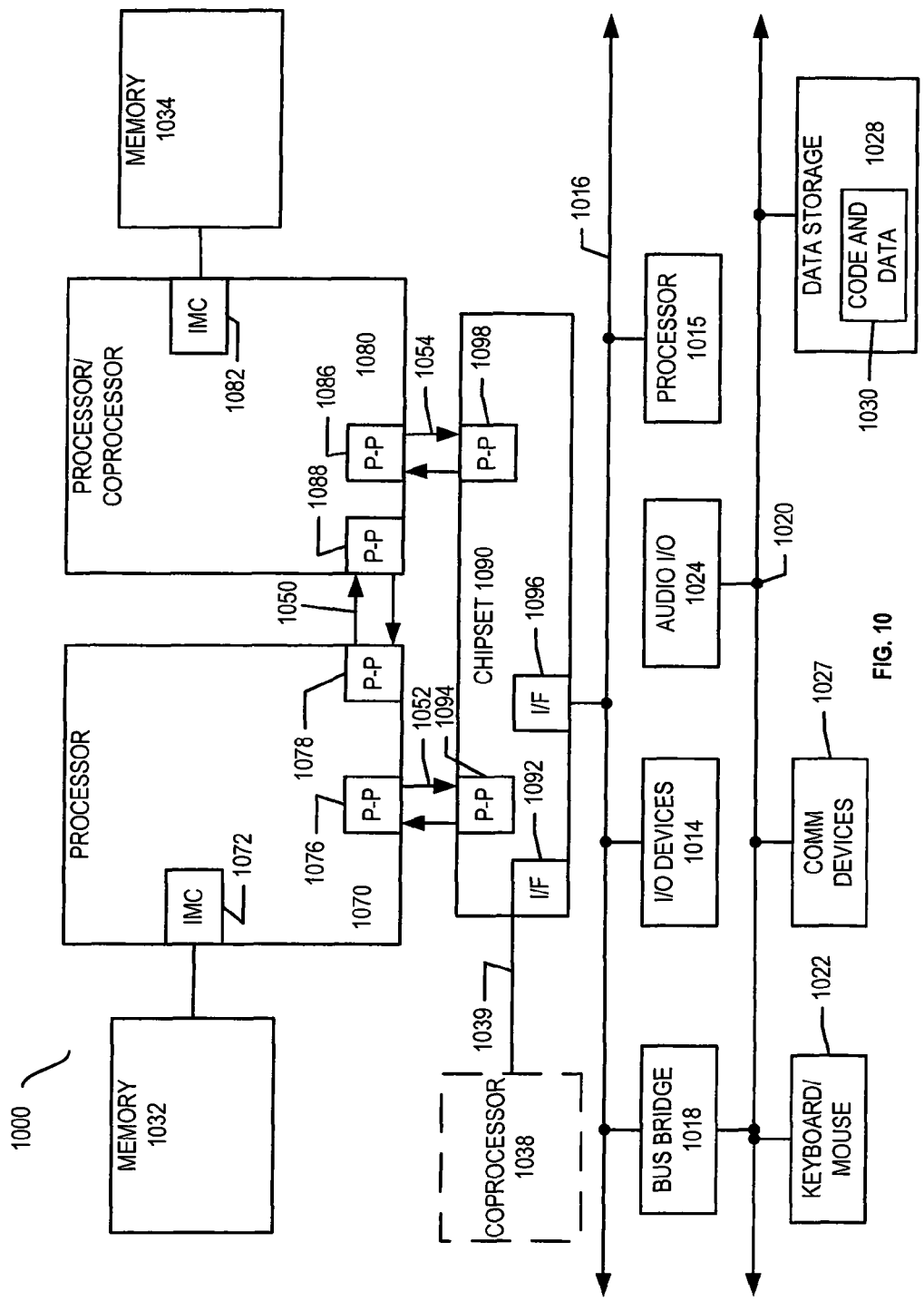
FIG. 10 shown is a block diagram of a first more specific exemplary system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
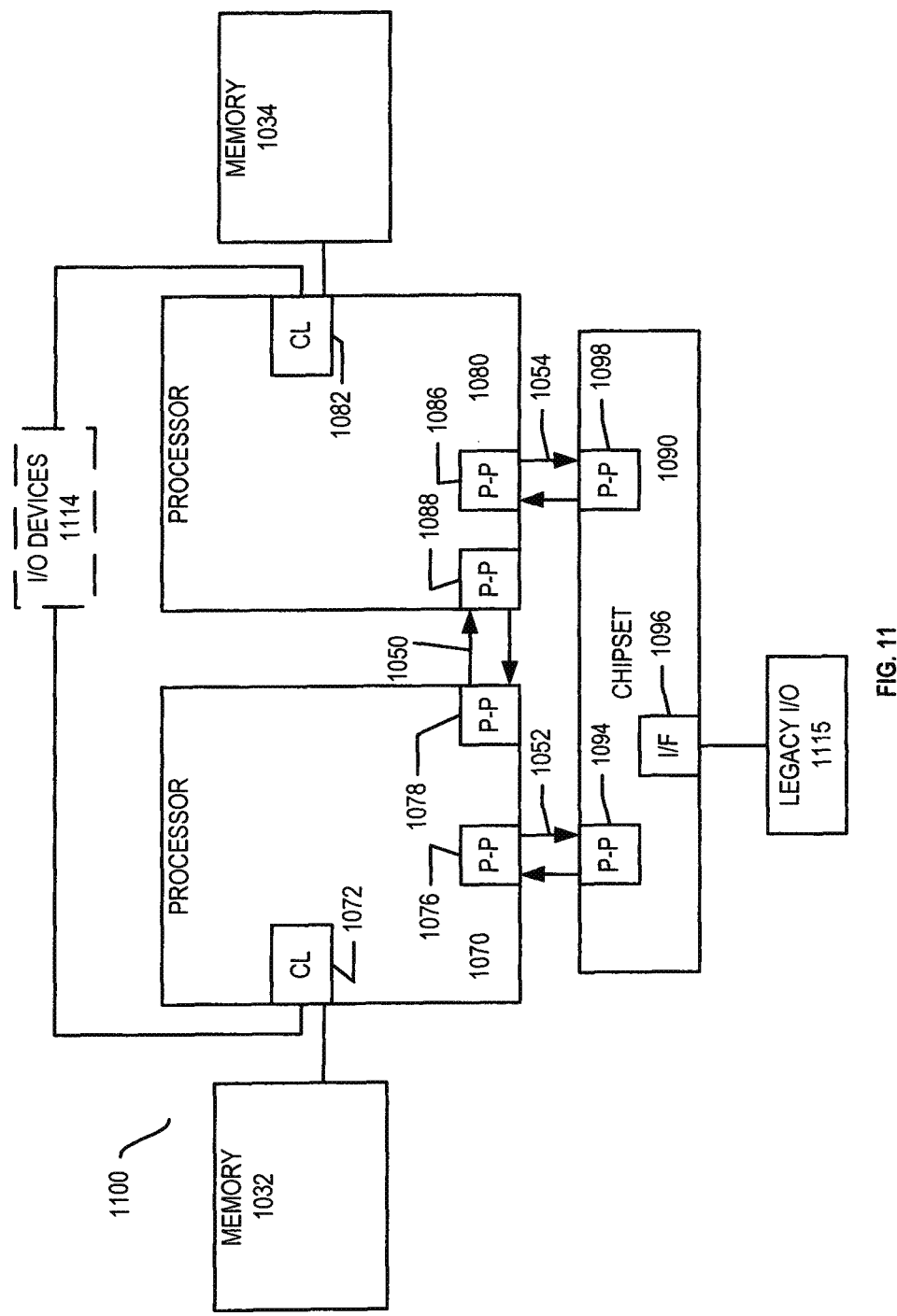
FIG. 11 shown is a block diagram of a second more specific exemplary system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
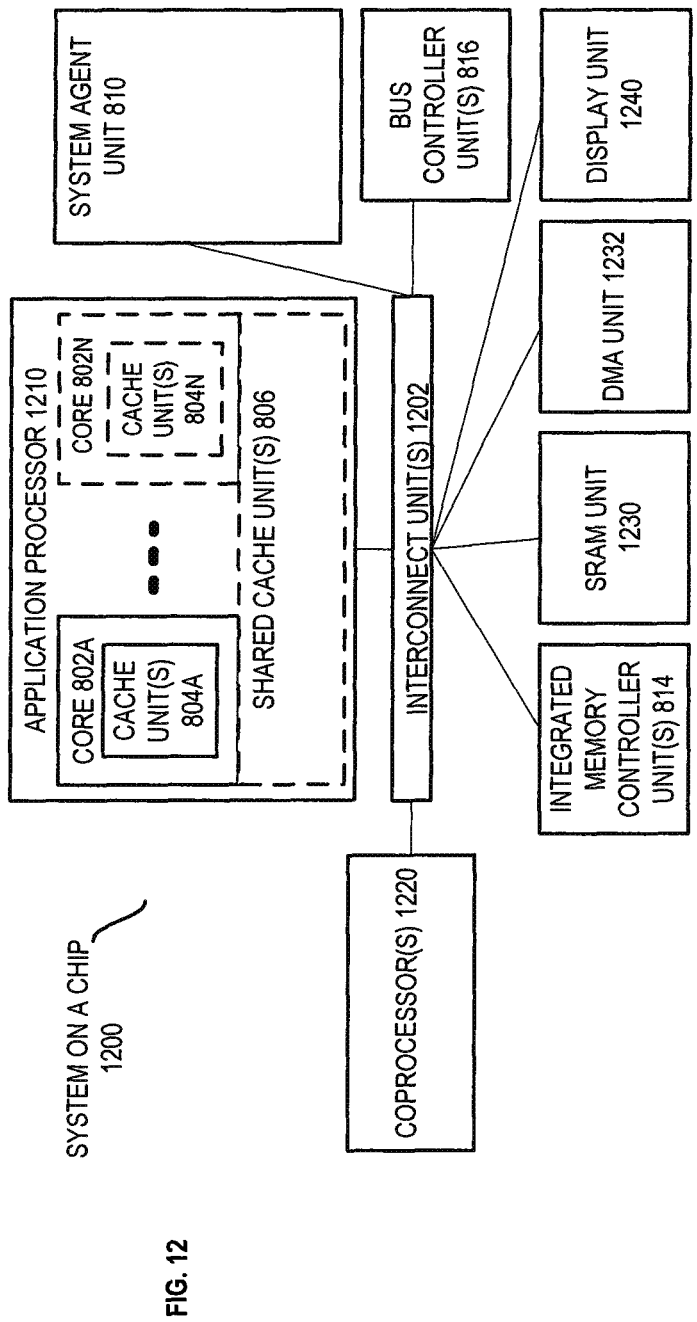
FIG. 12 shown is a block diagram of a SoC in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Components, features, and details described herein for any of the apparatus described herein may also optionally be used in and/or apply to any of the methods described herein, which in embodiments may be performed by and/or with such apparatus.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to perform the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to decode a user-level instruction. The user-level instruction is to indicate a page of a secure enclave and the user-level instruction to indicate a linear address. The processor also includes an execution logic coupled with the decode unit, the execution logic operable, in response to the user-level instruction, to change an initial linear address of the page of the secure enclave, which is to be stored in an enclave page storage metadata unit, to the linear address that is to be indicated by the user-level instruction, without contents of the page of the secure enclave being lost.

Example 2 includes the processor of Example 1 in which the execution logic is to change the initial linear address to the linear address that is to be indicated by the user-level instruction for dynamic page relocation.

Example 3 includes the processor of any preceding example in which the user-level instruction is to comprise an instruction of a dynamic library loader that is to run in the secure enclave.

Example 4 includes the processor of any preceding example further including a hardware-implemented indicator of the processor, and in which the execution logic, in response to the user-level instruction, is to configure the hardware-implemented indicator to indicate that a secure protection mechanism associated with the page of the secure enclave is outdated.

Example 5 includes the processor of Example 4 in which the hardware-implemented indicator includes one or more bits of the enclave page storage metadata unit, which correspond to the page of the secure enclave.

Example 6 includes the processor of Example 5 in which the enclave page storage metadata unit includes an enclave page cache map (EPCM).

Example 7 includes the processor of any preceding example in which the decode unit is to decode the user-level instruction that is to implicitly indicate general-purpose register EAX and is to indicate a second general-purpose register as a source of the linear address.

Example 8 is a method in a processor that includes receiving a user-level instruction. The user-level instruction indicating a page of a secure enclave and indicating a linear address. In response to the user-level instruction, changing an initial linear address of the page of the secure enclave, which is stored in an enclave page storage metadata unit, to the linear address indicated by the user-level instruction, without losing the contents of the page of the secure enclave.

Example 9 includes the method of Example 8 further including, in response to the user-level instruction, configuring a hardware-implemented indicator of the processor to indicate that a secure protection mechanism associated with the page of the secure enclave is outdated.

Example 10 is a processor or other apparatus that includes a hardware-implemented indicator, which is to correspond to a page of a secure enclave, and which is to be accessible to at least one user-level instruction. The processor also includes a decode unit to decode a privileged-level instruction. The privileged-level instruction to indicate the page of the secure enclave. The processor also includes an execution logic coupled with the decode unit, the execution logic operable, in response to the privileged-level instruction, to: update a secure protection mechanism associated with the indicated page of the secure enclave; and configure the hardware-implemented indicator to indicate that the secure protection mechanism associated with the page of the secure enclave is up to date.

Example 11 includes the processor of Example 10 in which the execution logic is operable, in response to the privileged-level instruction, to update the secure protection mechanism to prevent access to the indicated page of the secure enclave until all cached translations for a linear address of the page of the secure enclave have been cleared from the processor.

Example 12 includes the processor of any of Examples 10-11 in which the execution logic is operable, in response to the privileged-level instruction, to update the secure protection mechanism by associating a new blocked epoch with the page of the secure enclave.

Example 13 includes the processor of any of Examples 10-12 in which the hardware-implemented indicator includes one or more bits of an enclave page storage metadata unit of the processor.

Example 14 includes the processor of any of Examples 10-13 in which the enclave page storage metadata unit includes an enclave page cache map (EPCM) of the processor.

Example 15 includes the processor of any of Examples 10-14 in which the decode unit is to decode the privileged-level instruction that is to implicitly indicate general-purpose register EAX.

Example 16 is a system to process instructions that includes an interconnect and a processor coupled with the interconnect. The processor to receive a user-level instruction. The user-level instruction to indicate a page of a secure enclave and the user-level instruction to indicate a linear address. The processor operable, in response to the user-level instruction, to change an initial linear address of the page of the secure enclave, which is to be stored in an enclave page storage metadata unit, to the linear address that is to be indicated by the user-level instruction, without contents of the page of the secure enclave being lost. The system also includes a dynamic random access memory (DRAM) coupled with the interconnect.

Example 17 includes the system of Example 16 in which the processor is to change the initial linear address to the linear address that is to be indicated by the user-level instruction for dynamic page relocation. The processor further including a hardware-implemented indicator. The processor, in response to the user-level instruction, is to configure the hardware-implemented indicator to indicate that a secure protection mechanism associated with the page of the secure enclave is outdated.

Example 18 is an article of manufacture that includes a non-transitory machine-readable storage medium. The non-transitory machine-readable storage medium storing a user-level instruction. The user-level instruction to indicate a page of a secure enclave and the user-level instruction to indicate a linear address. The user-level instruction if executed by a machine operable to cause the machine to perform operations including changing an initial linear address of the page of the secure enclave, which is to be stored in an enclave page storage metadata unit, to the linear address that is to be indicated by the user-level instruction, without contents of the page of the secure enclave being lost.

Example 19 includes the article of manufacture of Example 18 in which the user-level instruction if executed by the machine is to cause the machine to configure a hardware-implemented indicator of the machine to indicate that a secure protection mechanism associated with the page of the secure enclave is outdated.

Example 20 includes a processor or other apparatus that is operable to perform the method of any of Examples 8-9.

Example 21 includes a processor or other apparatus that includes means for performing the method of any of Examples 8-9.

Example 22 includes a processor that includes modules, units, logic, circuitry, means, or any combination thereof, to perform the method of any of Examples 8-9.

Example 23 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 8-9.

Example 24 includes an optionally non-transitory machine-readable medium that optionally stores or otherwise provides an instruction that if and/or when executed by a processor, computer system, or other machine is operable to cause the machine to perform the method of any of Examples 8-9.

Example 25 includes a processor or other apparatus that is operable to perform one or more operations or any method substantially as described herein.

Example 26 includes a processor or other apparatus including means for performing one or more operations or any method substantially as described herein.

Example 27 includes a processor or other apparatus that is operable to perform any of the instructions substantially as described herein.

Example 28 includes a processor or other apparatus including means for performing any of the instructions substantially as described herein.

What is claimed is:

1. A processor comprising:
   a hardware-implemented indicator;
   a decode unit, which is implemented at least partially in hardware of the processor, to decode a user-level instruction, the user-level instruction to indicate a page of a secure enclave and the user-level instruction to indicate a linear address; and
   an execution logic coupled with the decode unit, the execution logic implemented at least partially in hardware of the processor and operable, in response to the user-level instruction,
   to change an initial linear address of the page of the secure enclave, which is to be stored in an enclave page storage metadata unit, to the linear address that is to be indicated by the user-level instruction, without contents of the page of the secure enclave being lost, and
   to configure the hardware-implemented indicator to indicate that a secure protection mechanism associated with the page of the secure enclave is outdated, wherein the hardware-implemented indicator is to comprise one or more bits of the enclave page storage metadata unit, which are to correspond to the page of the secure enclave.

2. The processor of claim 1, wherein the execution logic is to change the initial linear address to the linear address that is to be indicated by the user-level instruction for dynamic page relocation.

3. The processor of claim 1, wherein the user-level instruction is to comprise an instruction of a dynamic library loader that is to run in the secure enclave.

4. The processor of claim 1, wherein the enclave page storage metadata unit comprises an enclave page cache map (EPCM).

5. The processor of claim 1, wherein the decode unit is to decode the user-level instruction that is to implicitly indicate general-purpose register EAX and is to indicate a second general-purpose register as a source of the linear address.

6. A method in a processor comprising:
   receiving a user-level instruction, the user-level instruction indicating a page of a secure enclave and indicating a linear address;
   in response to the user-level instruction, changing an initial linear address of the page of the secure enclave, which is stored in an enclave page storage metadata unit, to the linear address indicated by the user-level instruction, without losing the contents of the page of the secure enclave; and
   in response to the user-level instruction, configuring a hardware-implemented indicator of the processor to indicate that a secure protection mechanism associated with the page of the secure enclave is outdated, wherein configuring the hardware-implemented indicator comprises configuring one or more bits of the enclave page storage metadata unit that correspond to the page of the secure enclave.

7. A processor comprising:
   a hardware-implemented indicator, which is to correspond to a page of a secure enclave, and which is to be accessible to at least one user-level instruction;
   a decode unit, which includes at least some hardware of the processor, to decode a privileged-level instruction, the privileged-level instruction to indicate the page of the secure enclave; and
   an execution logic coupled with the decode unit, the execution logic including at least some hardware of the processor, the execution logic operable, in response to the privileged-level instruction, to:
   update a secure protection mechanism associated with the indicated page of the secure enclave; and
   configure the hardware-implemented indicator to indicate that the secure protection mechanism associated with the page of the secure enclave is up to date, wherein the hardware-implemented indicator is to comprise one or more bits of an enclave page storage metadata unit.

8. The processor of claim 7, wherein the execution logic is operable, in response to the privileged-level instruction, to update the secure protection mechanism to prevent access to the indicated page of the secure enclave until all cached translations for a linear address of the page of the secure enclave have been cleared from the processor.

9. The processor of claim 7, wherein the execution logic is operable, in response to the privileged-level instruction, to update the secure protection mechanism by associating a new blocked epoch with the page of the secure enclave.

10. The processor of claim 7, wherein the enclave page storage metadata unit comprises an enclave page cache map (EPCM).

11. The processor of claim 7, wherein the decode unit is to decode the privileged-level instruction that is to implicitly indicate general-purpose register EAX.

12. A system to process instructions comprising:
an interconnect;
a processor coupled with the interconnect, the processor comprising a hardware-implemented indicator, the processor to receive a user-level instruction, the user-level instruction to indicate a page of a secure enclave and the user-level instruction to indicate a linear address, the processor operable, in response to the user-level instruction, to change an initial linear address of the page of the secure enclave, which is to be stored in an enclave page storage metadata unit, to the linear address that is to be indicated by the user-level instruction, without contents of the page of the secure enclave being lost, and to configure the hardware-implemented indicator to indicate that a secure protection mechanism associated with the page of the secure enclave is outdated, wherein the hardware-implemented indicator is to comprise one or more bits of the enclave page storage metadata unit, which are to correspond to the page of the secure enclave; and
a dynamic random access memory (DRAM) coupled with the interconnect.

13. The system of claim 12, wherein the processor is to change the initial linear address to the linear address that is to be indicated by the user-level instruction for dynamic page relocation.

14. An article of manufacture comprising a non-transitory machine-readable storage medium, the non-transitory machine-readable storage medium storing a user-level instruction, the user-level instruction to indicate a page of a secure enclave and the user-level instruction to indicate a linear address, and the user-level instruction if executed by a machine operable to cause the machine to perform operations comprising:
changing an initial linear address of the page of the secure enclave, which is to be stored in an enclave page storage metadata unit, to the linear address that is to be indicated by the user-level instruction, without contents of the page of the secure enclave being lost; and
configuring a hardware-implemented indicator of the machine to indicate that a secure protection mechanism associated with the page of the secure enclave is outdated, wherein the hardware-implemented indicator is to comprise one or more bits of the enclave page storage metadata unit, which are to correspond to the page of the secure enclave.

15. A processor comprising:
a die;
a decode unit on the die to decode a user-level instruction, the user-level instruction to indicate a page of a secure enclave and the user-level instruction to indicate a linear address;
logic of the processor on the die to prevent accesses to the page of the secure enclave from software not resident in the secure enclave including from privileged software; and
an execution logic on the die and coupled with the decode unit, the execution logic operable, in response to the user-level instruction, to change an initial linear address of the page of the secure enclave, which is to be stored in an enclave page storage metadata unit, to the linear address that is to be indicated by the user-level instruction, without contents of the page of the secure enclave being lost.

16. The processor of claim 15, wherein the execution logic, in response to the user-level instruction, is to configure one or more bits of the enclave page storage metadata unit to indicate that a secure protection mechanism associated with the page of the secure enclave is outdated.

17. The processor of claim 15, wherein the execution logic is to change the initial linear address to the linear address that is to be indicated by the user-level instruction for dynamic page relocation.

18. The processor of claim 15, wherein the user-level instruction is to comprise an instruction of a dynamic library loader that is to run in the secure enclave.

19. The processor of claim 15, wherein the decode unit is to decode the user-level instruction that is to implicitly indicate a first general-purpose register and is to indicate a second general-purpose register as a source of the linear address.

20. A processor comprising:
a die;
a hardware-implemented indicator on the die, which is to correspond to a page of a secure enclave, and which is to be accessible to at least one user-level instruction;
a decode unit on the die to decode a privileged-level instruction, the privileged-level instruction to indicate the page of the secure enclave; and
logic of the processor on the die to prevent accesses to the page of the secure enclave from software not resident in the secure enclave including from privileged software; and
an execution logic on the die and coupled with the decode unit, the execution logic operable, in response to the privileged-level instruction, to:
update a secure protection mechanism associated with the indicated page of the secure enclave; and
configure the hardware-implemented indicator to indicate that the secure protection mechanism associated with the page of the secure enclave is up to date.

21. The processor of claim 20, wherein the execution logic is operable, in response to the privileged-level instruction, to update the secure protection mechanism to prevent access to the indicated page of the secure enclave until all cached translations for a linear address of the page of the secure enclave have been cleared from the processor.

22. The processor of claim 20, wherein the execution logic is operable, in response to the privileged-level instruction, to update the secure protection mechanism by associating a new blocked epoch with the page of the secure enclave.

* * * * *